(12) United States Patent
Kawamura

(10) Patent No.: US 9,749,529 B2
(45) Date of Patent: Aug. 29, 2017

(54) IMAGE PICKUP APPARATUS HAVING WIRELESS TRANSMITTER-RECEIVER UNIT

(71) Applicant: CANON KABUSHIKI KAISHA, Tokyo (JP)

(72) Inventor: Ayumu Kawamura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/793,967

(22) Filed: Jul. 8, 2015

(65) Prior Publication Data
US 2015/0312480 A1    Oct. 29, 2015

Related U.S. Application Data

(63) Continuation of application No. 13/517,825, filed on Jun. 14, 2012.

(30) Foreign Application Priority Data

Jun. 20, 2011    (JP) .................................. 2011-136219

(51) Int. Cl.
*H04N 5/225*    (2006.01)
*H04N 5/232*    (2006.01)

(52) U.S. Cl.
CPC ....... *H04N 5/23241* (2013.01); *H04N 5/2253* (2013.01); *H04N 5/2254* (2013.01); *H04N 5/23245* (2013.01); *H04N 5/23293* (2013.01)

(58) Field of Classification Search
CPC .. H04N 5/2251; H04N 5/2252; H04N 5/2253; H04N 5/23241; H04N 5/23203; H04N 5/225

(Continued)

(56) References Cited

U.S. PATENT DOCUMENTS

2001/0009439 A1*  7/2001  Hwang ............. H04N 1/00236
                                                              348/231.99
2002/0109733 A1   8/2002  Watanabe et al.
(Continued)

FOREIGN PATENT DOCUMENTS

JP    2005-079931 A    3/2005
JP    2006-526300 A    11/2006

OTHER PUBLICATIONS

Mar. 31, 2015 Japanese Office Action, which is enclosed without an English Translation, that issued in Japanese Patent Application No. 2011-136219.

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

An image pickup apparatus is provided that is capable of avoiding an image pickup device and control system devices thereof from being affected by heat generated by a wireless transmitter-receiver unit, whereby the control system devices can stably be operated, while avoiding the quality of photographed image from being deteriorated. In the image pickup apparatus, a power unit has an upper limit of guaranteed temperature higher than that of the image pickup device and higher than those of an image processing unit and a control unit which are the control system devices, and is mounted on a mounting surface of a board together with the image processing unit and the control unit. A wireless transmitter-receiver unit is disposed parallel to and facing the mounting surface of the board so as to cover the power unit mounted on the board.

24 Claims, 6 Drawing Sheets

(58) Field of Classification Search
USPC ... 348/211.1, 211.2, 211.3, 207.99, 372–376
See application file for complete search history.

(56) References Cited

U.S. PATENT DOCUMENTS

| | | |
|---|---|---|
| 2003/0016284 A1 | 1/2003 | Squilla et al. |
| 2004/0239765 A1* | 12/2004 | Kuromatsu ........ H04N 1/00212 |
| | | 348/207.1 |
| 2005/0043587 A1 | 2/2005 | Fujimori et al. |
| 2005/0140823 A1* | 6/2005 | Ishikuro ............... H04N 5/2252 |
| | | 348/375 |
| 2005/0187433 A1 | 8/2005 | Horn et al. |
| 2005/0193424 A1* | 9/2005 | Matsuura ................ H03J 5/244 |
| | | 725/127 |
| 2006/0170787 A1 | 8/2006 | Bentkovski |
| 2007/0285517 A1 | 12/2007 | Ishikuro et al. |
| 2008/0002027 A1* | 1/2008 | Kondo ................... G05B 15/02 |
| | | 348/148 |
| 2009/0322937 A1* | 12/2009 | Young ................. H04B 7/0814 |
| | | 348/373 |
| 2010/0007749 A1 | 1/2010 | Azuma et al. |
| 2010/0271468 A1 | 10/2010 | Wang |
| 2011/0099302 A1 | 4/2011 | Ozeki |
| 2011/0199482 A1 | 8/2011 | Morgan |
| 2012/0075484 A1* | 3/2012 | Kawamoto ........... G06T 19/006 |
| | | 348/207.1 |

\* cited by examiner a # IMAGE PICKUP APPARATUS HAVING WIRELESS TRANSMITTER-RECEIVER UNIT

CROSS-REFERENCE TO RELATED APPLICATIONS

This application is a continuation of application Ser. No. 13/517,825, filed Jun. 14, 2012 the entire disclosure of which is hereby incorporated by reference.

BACKGROUND OF THE INVENTION

Field of the Invention

The present invention relates to an image pickup apparatus that has a wireless transmitter-receiver unit.

Description of the Related Art

Some image pickup apparatus has a wireless transmitter-receiver unit that wirelessly transmits data of an image, which is picked up by an image pickup device such as a CCD sensor or a CMOS sensor, and wirelessly receives image data from outside. If heat generated by the wireless transmitter-receiver unit in operation is conveyed to the image pickup device, the quality of picked-up image is deteriorated due to the influence of the heat.

In Japanese Laid-open Patent Publication No. 2005-79931, there is proposed a technique in which an image pickup device and a wireless transmitter-receiver unit are disposed away from each other to avoid heat generated by the wireless transmitter-receiver unit from being conveyed to the image pickup device, thereby avoiding the quality of picked-up image from being deteriorated by the generated heat.

However, even if the heat generated by the wireless transmitter-receiver unit can be avoided from being conveyed to the image pickup device by the technique disclosed in Japanese Laid-open Patent Publication No. 2005-79931, there is a fear that the generated heat is conveyed to control system devices such as an image processing unit and a control unit. In that case, the control system devices are affected by the heat and become unstable in operation.

SUMMARY OF THE INVENTION

The present invention provides an image pickup apparatus capable of avoiding an image pickup device and control system devices from being affected by heat generated by a wireless transmitter-receiver unit, thereby stably operating the control system devices, while avoiding the quality of photographed image from being deteriorated by the generated heat.

According to one aspect of this invention, there is provided an image pickup apparatus comprising an image pickup device configured to photoelectrically convert an object image into image signals, an image processing unit configured to perform image processing on the image signals output from the image pickup device, a control unit configured to control the image pickup device and the image processing unit, a power unit configured to supply electric power to the image pickup device, the image processing unit, and the control unit, a board having a mounting surface on which the image processing unit, the control unit, and the power unit are mounted, and a wireless transmitter-receiver unit configured to wirelessly transmit and receive image data, wherein the power unit has heat resistance higher than those of the image pickup device, the image processing unit, and the control unit, and the wireless transmitter-receiver unit is disposed facing the mounting surface of the board in such a manner that a distance between the wireless transmitter-receiver unit and the power unit becomes shorter than a distance between the wireless transmitter-receiver unit and the image pickup device, becomes shorter than a distance between the wireless transmitter-receiver unit and the image processing unit, and becomes shorter than a distance between the wireless transmitter-receiver unit and the control unit.

With this invention, it is possible to avoid the image pickup device and control system devices of the image pickup apparatus from being affected by the heat generated by the wireless transmitter-receiver unit of the image pickup apparatus, whereby the control system devices can stably be operated, while avoiding the quality of photographed image from being deteriorated.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
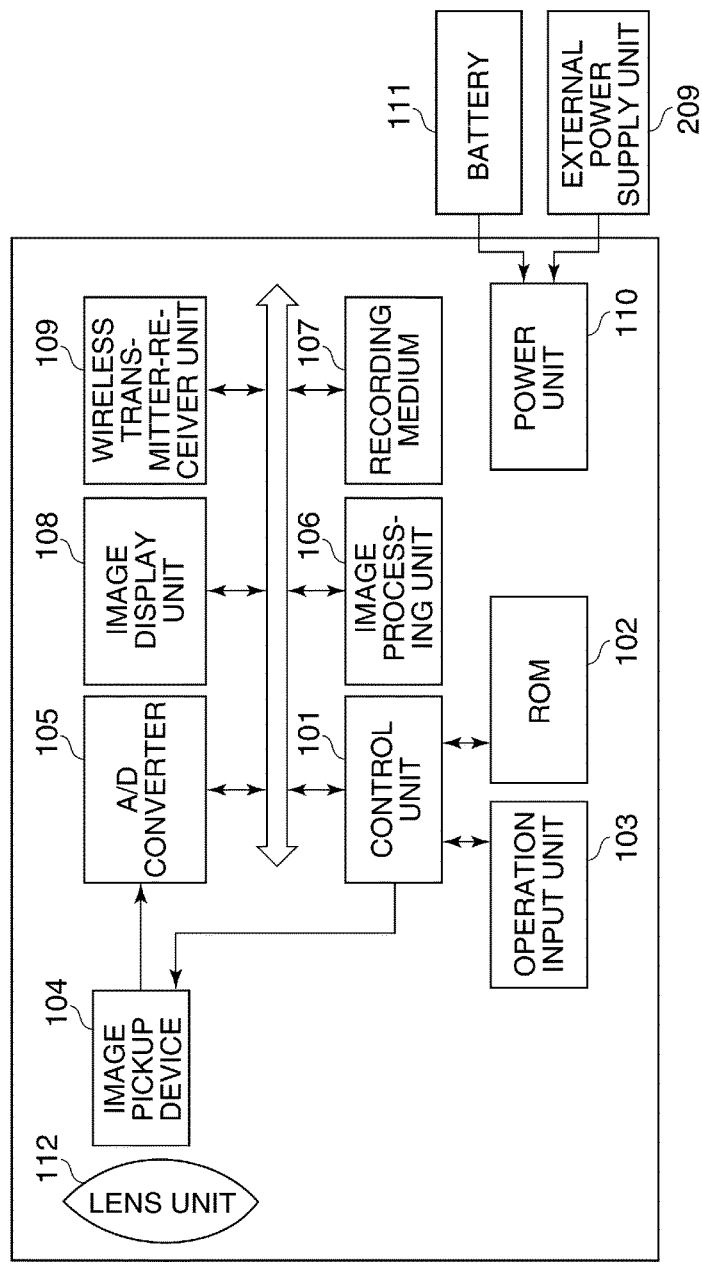
FIG. 1 is a block diagram showing a control system of a digital video camera, which is an example of an image pickup apparatus according to one embodiment of this invention.

FIG. 1 shows, in block diagram, a control system of a digital video camera, which is an example of an image pickup apparatus according to one embodiment of this invention.

As shown in FIG. 1, the digital video camera of this embodiment includes an image pickup device 104, which is comprised of, e.g., a CCD sensor or a CMOS sensor. An object image passing through a lens unit 112 is formed on the image pickup device 104 that photoelectrically converts the object image into a series of analog image signals. Under the control of a control unit 101, the analog image signals are output to an A/D converter 105.

The A/D converter 105 converts the analog image signals into digital image signals and outputs these signals to an image processing unit 106 under the control of the control unit 101. In, e.g., a recording mode, the digital image signals are sequentially output from the A/D converter 105 to an image display unit 108, and an image is displayed on the image display unit 108. The image display unit 108 functions as an electronic view finder or an LCD monitor.

The image processing unit 106 performs various image processing such as enlargement/reduction processing on the digital image signals supplied from the A/D converter 105. In, e.g., image recording processing, the digital image signals subjected to image processing are sequentially accumulated into, e.g., a RAM (not shown). Then, the accumulated image signals are encoded, together with photographing time information and frame rate information, into moving image data of AVCHD format, and are recorded into a recording medium 107.

Under the control of the control unit 101, the image processing unit 106 reads and decodes the encoded moving image data recorded in the recording medium 107, and outputs the decoded moving image data to the image display unit 108. Also, the image processing unit 106 performs image processing on moving image data and on GUI data stored in a ROM 102, synthesizes the processed moving image data and the processed GUI data together, and outputs the synthesized data to the image display unit 108.

An operation input unit 103 accepts a user operation input, and notifies the control unit 101 of a content of the operation input. The operation input unit 103 includes, for example, a mode changeover switch 201, trigger switch 202, power ON/OFF switch 203, and wireless transmission reception ON/OFF switch 204 (see FIGS. 2 and 3).

A wireless transmitter-receiver unit 109 performs processing for wireless transmission on moving image data or still image data stored in the recording medium 107 or on picked-up image data, and transmits the processed image data via an antenna (not shown). The wireless transmitter-receiver unit 109 receives image data via the antenna, performs predetermined processing on the received image data, and outputs the processed data to the image display unit 108. At image data transmission and reception, the wireless transmitter-receiver unit 109 sometimes generates heat and becomes high temperature.

A power unit 110 converts electric power supplied from each of a battery 111 and an external power supply unit 209 into a predetermined voltage, and supplies the power of the predetermined voltage to respective parts of the camera.

The control unit 101 controls the entire camera. To this end, the control unit 101 reads out a control program stored in, e.g., the ROM 102, develops the control program on the RAM (not shown), and executes the control program to thereby control operations of respective parts of the camera.

The control unit 101 and the image processing unit 106 (which are control system devices of the camera) each have a low upper limit of guaranteed temperature, and each become unstable in operation when the upper limit of guaranteed temperature is exceeded. When an upper limit of guaranteed temperature of the image pickup device 104 is exceeded, the quality of picked-up image tends to be deteriorated.

Figure 2:
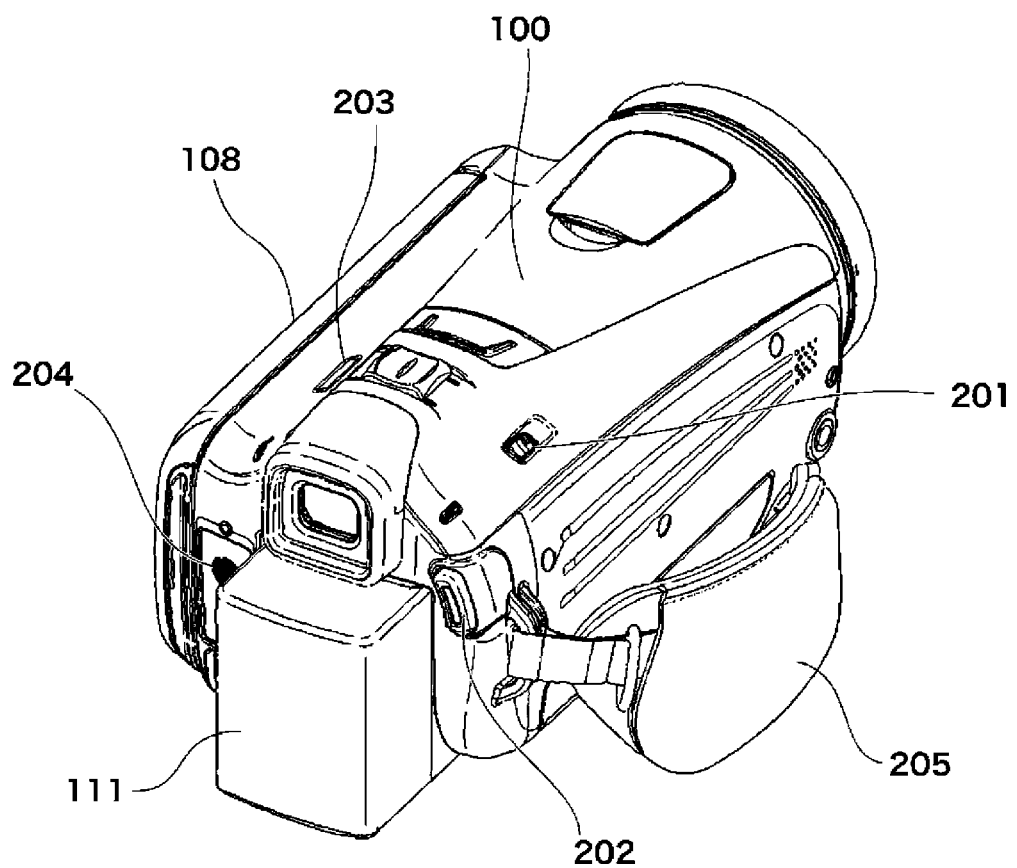
FIG. 2 is an external perspective view of the digital video camera as seen from the rear of the camera.
Figure 3:
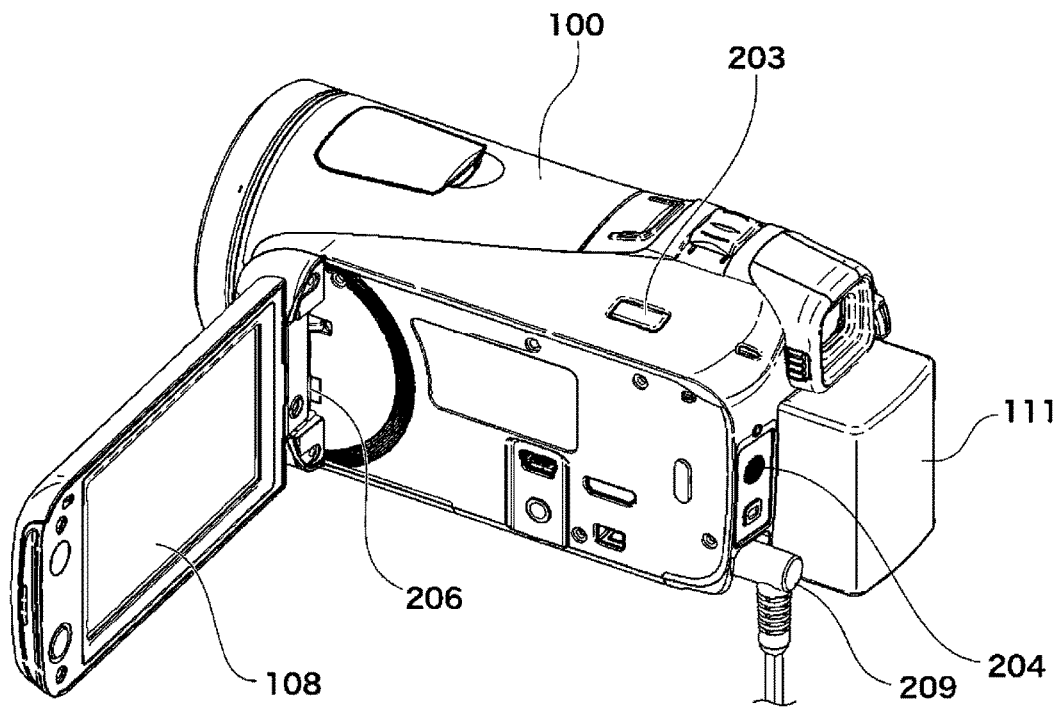
FIG. 3 is an external perspective view showing a state where an image display unit of the digital video camera is open.

FIG. 2 shows in external perspective view the digital video camera as seen from a photographer's side (i.e., from the rear of the camera). FIG. 3 shows in external perspective view a state where the image display unit 108 of the digital video camera is open.

As shown in FIGS. 2 and 3, a grip belt 205 is provided on a right side surface of the camera body 100 as seen from the photographer's side. The photographer can hold the camera body 100 with one hand placed between the camera body 100 and the grip belt 205. The image display unit 108 is openably and closably provided on a left side surface of the camera body 100 through a hinge 206. The image display unit 108 when closed is received in the left side surface of the camera body 100.

The mode changeover switch 201 and the power ON/OFF switch 203 are provided on an upper surface of the camera body 100, and the trigger switch 202, wireless transmission reception ON/OFF switch 204, external power supply unit 209, and battery 111 are provided on a rear surface of the camera body 100.

Figure 4:
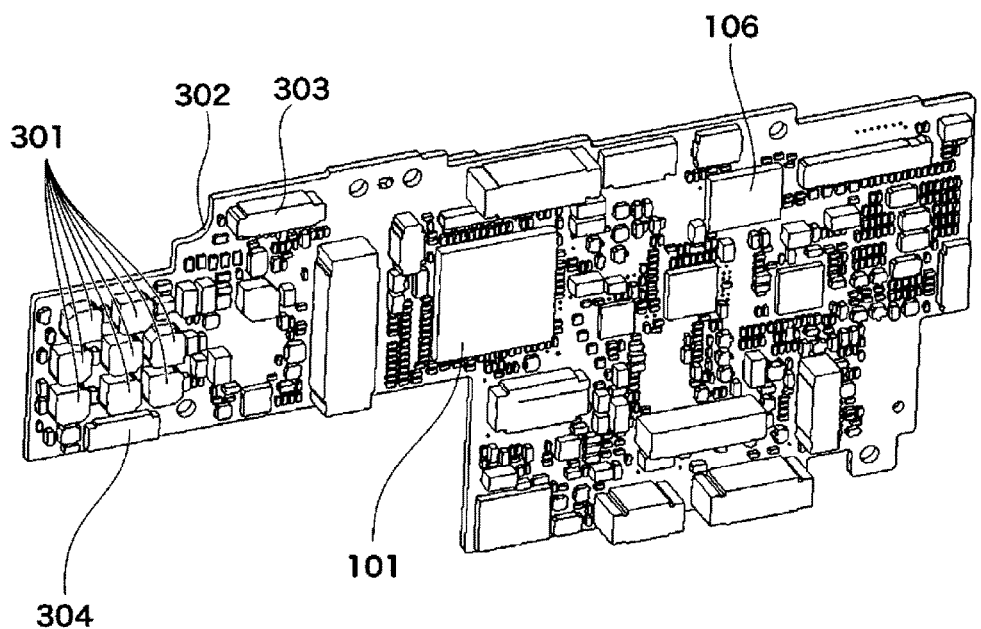
FIG. 4 is a perspective view of a main board of the camera.
Figure 5:
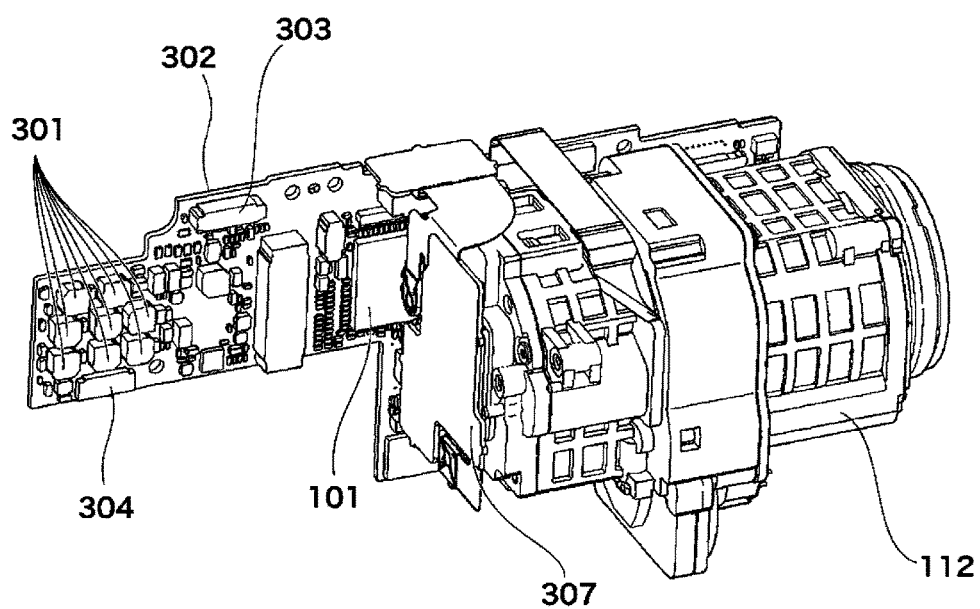
FIG. 5 is a perspective view showing an example arrangement of the main board and a lens unit in the camera.
Figure 6:
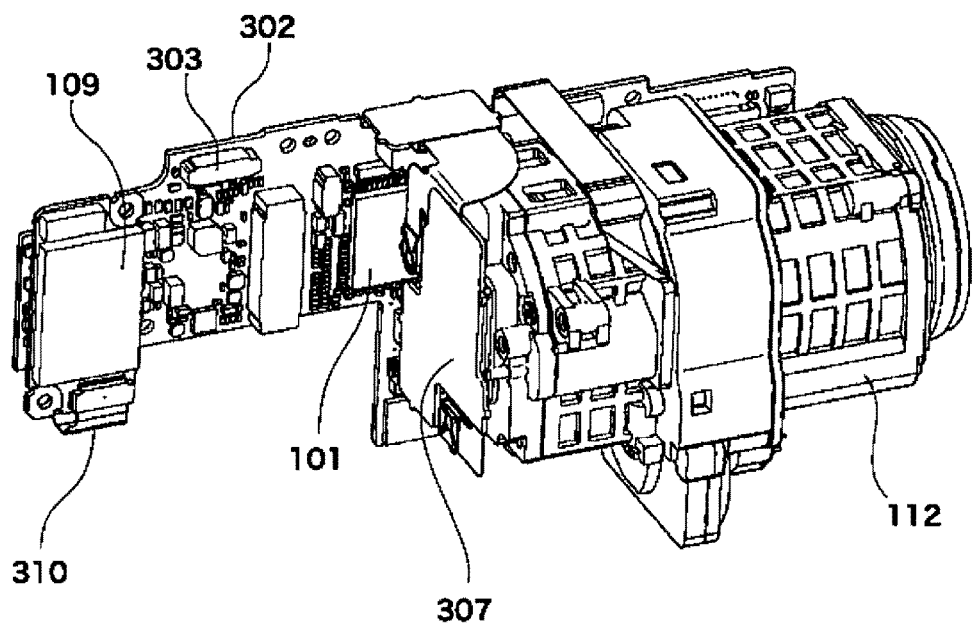
FIG. 6 is a perspective view showing a state where a wireless transmitter-receiver unit is connected to the main board.
Figure 7:
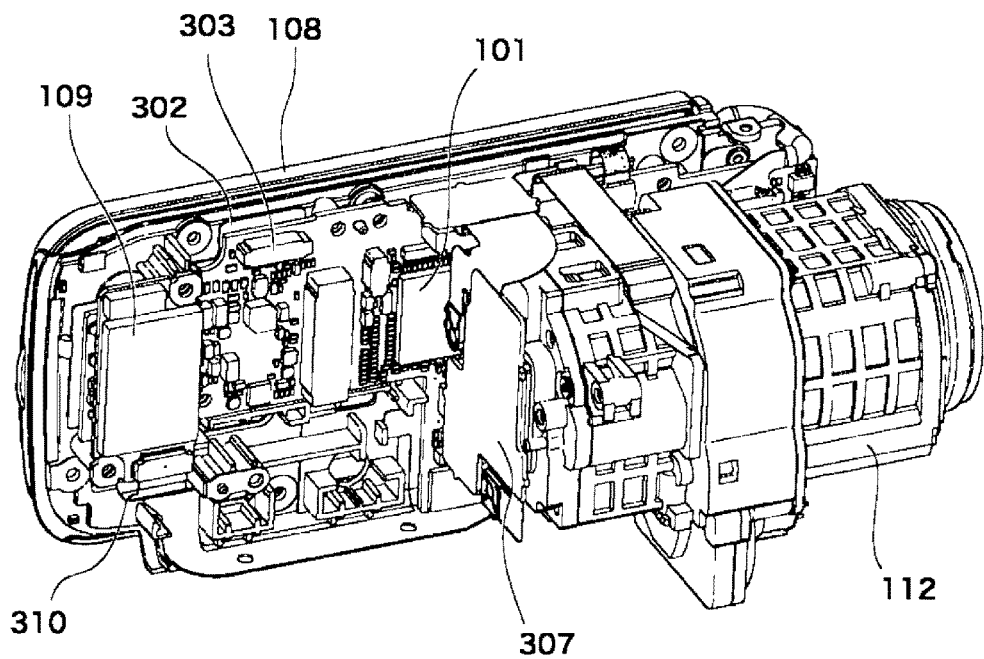
FIG. 7 is a perspective view showing a positional relation between the main board and the image display unit.

FIG. 4 shows in perspective view a main board 302, FIG. 5 shows in perspective view an example arrangement of the main board 302 and the lens unit 112, and FIG. 6 shows in perspective view a state where the wireless transmitter-receiver unit 109 is connected to the main board 302. FIG. 7 shows a positional relation between the main board 302 and the image display unit 108 in perspective view.

As shown in FIG. 4, the control unit 101, the image processing unit 106, and power inductors 301 of the power unit 110 are mounted on the main board 302. The main board 302 is disposed in the camera body 100 in such a manner that the side of the main board 302 on which the power inductors 301 are mounted (i.e., the left side of the main board 302 as seen in FIG. 4) faces the rear surface of the camera body 100. Thus, the power inductors 301 are mounted near the external power supply unit 209 and near the battery 111, whereby wirings between the power inductors 301 and the external power supply unit 209 and between the power inductors 301 and the battery 111 can be shortened in length.

The power inductors 301 have an upper limit of guaranteed temperature higher than those of the image pickup device 104, control unit 101, and image processing unit 106. In other words, the power inductors 301 of the power unit 110 are higher in heat resistance than the image pickup device 104, control unit 101, and image processing unit 106. In addition, the power inductors 301 hardly become unstable in operation, even if the upper limit of guaranteed temperature is exceeded.

As shown in FIGS. 5 and 7, the main board 302 is disposed between the lens unit 112 and the left side surface of the camera body 100 and substantially parallel to the left side surface in which the image display unit 108 in the closed state is received. Thus, heat generated in the main board 302 is hardly conveyed to the right side surface of the camera body 100 on which the grip belt 205 is provided. The main board 302 serving as a board of this invention has amounting surface thereof disposed on a side close to the lens unit 112. The mounting surface of the main board 302 has a central portion thereof on which the control unit 101 is mounted, a front-end side thereof (which is close to the lens unit 112) on which the image processing unit 106 is mounted, and a rear-end side thereof on which the power inductors 301 are mounted.

Connectors 303, 304 are mounted on the main board 302. The connector 303 is disposed between the power inductors 301 and the control unit 101. The connector 304 is disposed downward of the power inductors 301. On the rear-end side of the lens unit 112, a device board 307 on which the image pickup device 104 is mounted is disposed to extend perpendicular to the main board 302.

The main board 302 is supplied with electric power from the battery 111 or from the external power supply unit 209 through a flexible board (not shown) and the connector 303. The power supplied to the main board 302 is converted into a predetermined voltage by the power unit 110 that includes the power inductors 301, and then the power of the predetermined voltage is supplied to respective parts of the camera. Power to the wireless transmitter-receiver unit 109 is supplied via the connector 304 and a flexible board 310 (see FIG. 6).

The wireless transmitter-receiver unit 109 is disposed substantially parallel to and facing the mounting surface of the main board 302 so as to be close to and so as to cover the power inductors 301 mounted on the main board 302. Thus, a distance between the transmitter-receiver unit 109 and the power inductors 301 becomes shorter than a distance between the transmitter-receiver unit 109 and the control unit 101, becomes shorter than a distance between the transmitter-receiver unit 109 and the image processing unit 106, and becomes shorter than a distance between the transmitter-receiver unit 109 and the image pickup device 104. In other words, among the component parts mounted on the main board 302, the power inductors 301 having a high upper limit of guaranteed temperature are most affected by the heating of the wireless transmitter-receiver unit 109.

In this embodiment, the operation mode of the camera can be switched between a photographing mode and a playback mode by using the mode changeover switch 201. In the photographing mode, however, an amount of heat generated by the power inductors 301 increases. When the wireless transmission reception ON/OFF switch 204 is turned on in the photographing mode, the wireless transmitter-receiver unit 109 operates and generates heat. Thus, there is a fear that the image pickup device 104, control unit 101, and image processing unit 106, which are disposed away from the wireless transmitter-receiver unit 109, are affected by the heat generated by the power inductors 301 and by the wireless transmitter-receiver unit 109.

Accordingly, in this embodiment, the ON-operation of the wireless transmission reception ON/OFF switch 204 is made ineffective in the photographing mode. To this end, the control unit 101 executes a switch operation disabling process shown in FIG. 8.

Figure 8:
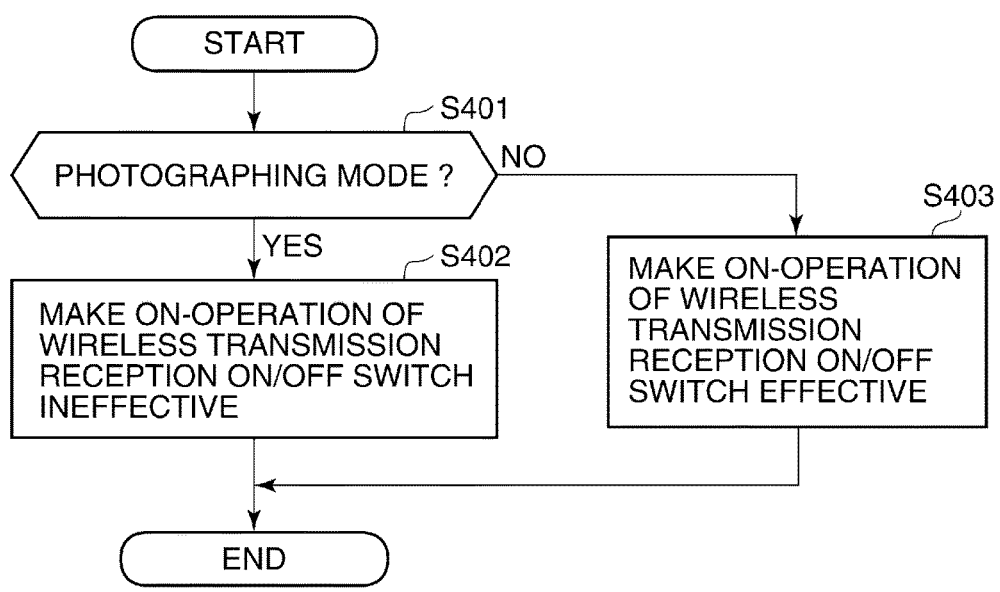
FIG. 8 is a flowchart showing a switch operation disabling process performed by a control unit of the camera to make an ON-operation of a wireless transmission reception ON/OFF switch ineffective.

In the switch operation disabling process of FIG. 8, the control unit 101 determines based on a signal from the mode changeover switch 201 whether the camera operates in the photographing mode (step S401). When the camera operates in the photographing mode, the process proceeds to step S402 where the control unit 101 makes the ON-operation of the wireless transmission reception ON/OFF switch 204 ineffective. On the other hand, when the camera does not operate in the photographing mode, the process proceeds to step S403 where the control unit 101 makes the ON-operation of the wireless transmission reception ON/OFF switch 204 effective.

Accordingly, in the photographing mode where the amount of heat generated by the power inductors 301 becomes large, the control unit 101 performs control to cause the wireless transmitter-receiver unit 109 to become inoperable. It should be noted that in the photographing mode, the control unit 101 can perform control to stop the operation per se of the wireless transmitter-receiver unit 109 instead of making the ON-operation of the wireless transmission reception ON/OFF switch 204 ineffective.

As describe above, according to this embodiment, the distance between the wireless transmitter-receiver unit 109 and the power inductors 301 is made shorter than the distance between the transmitter-receiver unit 109 and the control unit 101, is made shorter than the distance between transmitter-receiver unit 109 and the image processing unit 106, and is made shorter than the distance between the transmitter-receiver unit 109 and the image pickup device 104. On the other hand, the power inductors 301 each have heat resistance higher than those of component parts of the image pickup device 104, and higher than those of component parts of the control system devices (such as the control unit 101 and the image processing unit 106) of the video camera. Thus, the video camera is not brought into an inoperable state, even if the power inductors 301 are affected by the heating of the wireless transmitter-receiver unit 109. Furthermore, influences of heat generated by the wireless transmitter-receiver unit 109 on the image pickup device 104 and on the control system devices can be reduced, whereby the control system devices can stably be operated while avoiding the quality of photographed image from being deteriorated.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-136219, filed Jun. 20, 2011, which is hereby incorporated by reference herein in its entirety.

What is claimed is:

1. An image pickup apparatus comprising:
   an image pickup device configured to photoelectrically convert an object image into image signals;
   a lens unit configured to form the object image on the image pickup device;
   an image processor for processing the image signals output from the image pickup device;
   a controller for controlling the image pickup device and the image processor;
   a converter for converting electric power supplied from a battery and supplying the converted electric power to the image pickup device, the image processor, and the controller;
   a first circuit board on which the image processor, the controller and the converter are mounted; and
   a wireless transmitter for wirelessly transmitting data,
   wherein the wireless transmitter is disposed on the first circuit board,
   wherein the image pickup device is mounted on the lens unit via a second circuit board,
   wherein the first circuit board is disposed in such a manner that the converter mounted on the first circuit board does not overlap the image pickup device and the lens unit,
   wherein the wireless transmitter is disposed in such a manner that the wireless transmitter overlaps the converter,
   wherein the converter has heat resistance higher than any one of the image pickup device, the image processor, and the controller, and
   wherein the wireless transmitter is disposed in such a manner that a distance between the wireless transmitter and the converter is shorter than any one of a distance between the wireless transmitter and the image pickup device, a distance between the wireless transmitter and the image processor, and a distance between the wireless transmitter and the controller.

2. The image pickup apparatus according to claim 1,
   wherein the second circuit board extends perpendicular to the first circuit board, and
   wherein the wireless transmitter is disposed substantially parallel to the mounting surface of the first circuit board so as to overlap the converter.

3. The image pickup apparatus according to claim 1, further including:
an image display unit configured to be rotatably provided on a side surface of the image pickup apparatus,
wherein the first circuit board is disposed between the lens unit and the side surface of the image pickup apparatus.

4. The image pickup apparatus according to claim 1, further including:
a mode changeover switch configured to switch an operation mode of the image pickup apparatus between a photographing mode and a playback mode,
wherein in a case where the controller determines, based on a signal from the mode changeover switch, that the image pickup apparatus operates in the photographing mode, the controller controls the wireless transmitter such that the wireless transmitter does not operate.

5. The image pickup apparatus according to claim 4, further including:
a wireless transmission reception ON/OFF switch configured to be ON-OFF operated,
wherein in a case where the controller determines that the image pickup apparatus operates in the photographing mode, the controller makes an ON-operation of the wireless transmission reception ON/OFF switch ineffective.

6. An image pickup apparatus comprising:
an image pickup device configured to photoelectrically convert an object image into image signals;
a lens unit configured to form the object image on the image pickup device;
an image processor for processing the image signals output from the image pickup device;
a converter for converting electric power supplied from a battery and supplying the converted electric power to the image pickup device and the image processor;
a first circuit board on which the image processor and the converter are mounted; and
a wireless transmitter for wirelessly transmitting data,
wherein the wireless transmitter is disposed on the first circuit board,
wherein the image pickup device is mounted on the lens unit via a second circuit board,
wherein the first circuit board is disposed in such a manner that the converter mounted on the first circuit board does not overlap the image pickup device and the lens unit,
wherein the wireless transmitter is disposed in such a manner that the wireless transmitter overlaps the converter, and
wherein the wireless transmitter is disposed in such a manner that a distance between the wireless transmitter and the converter is shorter than any one of a distance between the wireless transmitter and the image pickup device, and a distance between the wireless transmitter and the image processor.

7. The image pickup apparatus according to claim 6,
wherein the second circuit board extends perpendicular to the first circuit board, and
wherein the wireless transmitter is disposed substantially parallel to the first circuit board so as to cover the converter.

8. The image pickup apparatus according to claim 6, further including:
an image display unit configured to be rotatably provided on a side surface of the image pickup apparatus,
wherein the first circuit board is disposed between the lens unit and the side surface of the image pickup apparatus.

9. The image pickup apparatus according to claim 6, further including:
a mode changeover switch configured to switch an operation mode of the image pickup apparatus between a photographing mode and a playback mode,
wherein in a case where a controller determines, based on a signal from the mode changeover switch, that the image pickup apparatus operates in the photographing mode, the controller controls the wireless transmitter such that the wireless transmitter does not operate.

10. The image pickup apparatus according to claim 9, further including:
a wireless transmission reception ON/OFF switch configured to be ON-OFF operated,
wherein in a case where the controller determines that the image pickup apparatus operates in the photographing mode, the controller makes an ON-operation of the wireless transmission reception ON/OFF switch ineffective.

11. An image pickup apparatus comprising:
an image pickup device configured to photoelectrically convert an object image into image signals;
a lens unit configured to form the object image on the image pickup device;
a controller for controlling the image pickup device;
a converter for converting electric power supplied from a battery and supplying the converted electric power to the image pickup device and the controller;
a first circuit board on which the controller and the converter are mounted; and
a wireless transmitter for wirelessly transmitting data,
wherein the wireless transmitter is disposed on the first circuit board,
wherein the image pickup device is mounted on the lens unit via a second circuit board,
wherein the first circuit board is disposed in such a manner that the converter mounted on the first circuit board does not overlap the image pickup device and the lens unit,
wherein the wireless transmitter is disposed in such a manner that the wireless transmitter overlaps the converter, and
wherein the wireless transmitter is disposed in such a manner that a distance between the wireless transmitter and the converter is shorter than any one of a distance between the wireless transmitter and the image pickup device, and a distance between the wireless transmitter and the controller.

12. The image pickup apparatus according to claim 11,
wherein the second circuit board extends perpendicular to the first circuit board, and
wherein the wireless transmitter is disposed substantially parallel to the first circuit board so as to overlap the converter.

13. The image pickup apparatus according to claim 11, further including:
an image display unit configured to be rotatably provided on a side surface of the image pickup apparatus,
wherein the first circuit board is disposed between the lens unit and the side surface of the image pickup apparatus.

14. The image pickup apparatus according to claim 11, further including:
a mode changeover switch configured to switch an operation mode of the image pickup apparatus between a photographing mode and a playback mode,
wherein in a case where the controller determines, based on a signal from the mode changeover switch, that the image pickup apparatus operates in the photographing mode, the controller controls the wireless transmitter such that the wireless transmitter does not operate.

15. The image pickup apparatus according to claim 11, further including:
a wireless transmission reception ON/OFF switch configured to be ON-OFF operated,
wherein in a case where the controller determines that the image pickup apparatus operates in the photographing mode, the controller makes an ON-operation of the wireless transmission reception ON/OFF switch ineffective.

16. The image pickup apparatus according to claim 1, wherein the wireless transmitter is disposed on the first circuit board in such a manner that the wireless transmitter covers another circuit element on the first circuit board.

17. The image pickup apparatus according to claim 16, wherein said another circuit element includes the converter.

18. The image pickup apparatus according to claim 1, wherein the converter includes inductors.

19. The image pickup apparatus according to claim 6, wherein the wireless transmitter is disposed on the first circuit board in such a manner that the wireless transmitter covers another circuit element on the first circuit board.

20. The image pickup apparatus according to claim 19, wherein the said another circuit element includes the converter.

21. The image pickup apparatus according to claim 6, wherein the converter includes inductors.

22. The image pickup apparatus according to claim 11, wherein the wireless transmitter is disposed on the first circuit board in such a manner that the wireless transmitter covers another circuit element on the first circuit board.

23. The image pickup apparatus according to claim 22, wherein said another circuit element includes the converter.

24. The image pickup apparatus according to claim 11, wherein the converter includes inductors.

* * * * *